US012300118B2

(12) United States Patent
Taylor et al.

(10) Patent No.: US 12,300,118 B2
(45) Date of Patent: *May 13, 2025

(54) WEARABLE WOUND TREATMENT SIMULATION DEVICES

(71) Applicant: Avkin, Inc., Newport, DE (US)

(72) Inventors: Andrew Taylor, Newport, DE (US); Amy Cowperthwait, Newport, DE (US); Amy Bucha, Newport, DE (US); Olivia Smith, Newport, DE (US)

(73) Assignee: Avkin, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,170

(22) Filed: Feb. 23, 2024

(65) Prior Publication Data

US 2024/0212524 A1 Jun. 27, 2024

Related U.S. Application Data

(63) Continuation of application No. 17/213,640, filed on Mar. 26, 2021, now Pat. No. 11,955,030.

(51) Int. Cl.
*G09B 23/30* (2006.01)
*G09B 23/34* (2006.01)

(52) U.S. Cl.
CPC .......... *G09B 23/303* (2013.01); *G09B 23/34* (2013.01)

(58) Field of Classification Search
CPC ....... G09B 23/28; G09B 23/30; G09B 23/303
See application file for complete search history.

(56) References Cited

U.S. PATENT DOCUMENTS 5,839,904 A 11/1998 Bloom
6,319,011 B1 11/2001 Motti et al.
(Continued)

FOREIGN PATENT DOCUMENTS

CN 2096789 U 2/1992
CN 201004285 Y 1/2008
(Continued)

OTHER PUBLICATIONS

Castillo, C., "Cut Suits' Help Soldiers Stay a Cut Above in Realistic Training Exercise", Joint Base San Antonio, Jun. 4, 2014, pp. 1-2, http://www.jbsa.af.mil/news/story.asp?id=123413317, 2 pages.
(Continued)

*Primary Examiner* — Kurt Fernstrom
(74) *Attorney, Agent, or Firm* — Buchanan Ingersoll & Rooney PC

(57) ABSTRACT

A wound treatment simulation device and method of operating thereof are disclosed. The device includes a housing, a simulated wound structure, a pump, a power supply, a sensor, a feedback device, and a microprocessor. The housing is configured to be secured to the live subject and to cover at least a portion of a body of the subject. The wound structure is configured to simulate a structure associated with the type of simulated wound treatment. The at least one feedback device is configured to provide a feedback signal to the live subject. The microprocessor is connected to the sensor and the feedback device. The microprocessor is programmed to operate the feedback device to provide haptic feedback based upon input (e.g. force or pressure) generated from interaction between a treatment provider and the simulated wound structure. The disclosed device may be used to simulate a variety of wound care and treatments.

14 Claims, 11 Drawing Sheets

(56) References Cited

U.S. PATENT DOCUMENTS

| | | |
|---|---|---|
| 6,780,016 B1 | 8/2004 | Toly |
| 8,221,129 B2 | 7/2012 | Parry et al. |
| 8,342,852 B2 | 1/2013 | King |
| 8,408,920 B2 | 4/2013 | Speller |
| 8,491,309 B2 | 7/2013 | Parry et al. |
| 8,840,403 B2 | 9/2014 | Segall |
| 8,882,511 B2 | 11/2014 | McKenzie et al. |
| 8,944,825 B2 | 2/2015 | Reid-Searl et al. |
| 10,629,084 B2 | 4/2020 | Blankenship |
| 10,803,761 B2 | 10/2020 | Welch et al. |
| 11,594,151 B2 | 2/2023 | Segall |
| 11,600,200 B2 | 3/2023 | Hare |
| 2007/0218438 A1 | 9/2007 | Sanders et al. |
| 2008/0171311 A1 | 7/2008 | Centen et al. |
| 2009/0298034 A1 | 12/2009 | Parry et al. |
| 2010/0062407 A1 | 3/2010 | Lecat |
| 2010/0185127 A1 | 7/2010 | Nilsson et al. |
| 2010/0196865 A1 | 8/2010 | Kays et al. |
| 2011/0223573 A1 | 9/2011 | Miller et al. |
| 2012/0091212 A1 | 4/2012 | Guilhamat et al. |
| 2012/0270197 A1 | 10/2012 | Brost et al. |
| 2012/0330200 A1 | 12/2012 | Voss et al. |
| 2013/0059279 A1 | 3/2013 | Reid-Searl et al. |
| 2013/0196302 A1 | 8/2013 | Lecat |
| 2013/0337425 A1 | 12/2013 | Allen et al. |
| 2014/0004494 A1 | 1/2014 | Griesser et al. |
| 2014/0302473 A1 | 10/2014 | Nakaguchi et al. |
| 2015/0024363 A1 | 1/2015 | Segall |
| 2015/0086958 A1 | 3/2015 | Lewis |
| 2016/0171911 A1 | 6/2016 | Parry, Jr. et al. |
| 2016/0247419 A1 | 8/2016 | Parry et al. |
| 2017/0049164 A1 | 2/2017 | Gruentzig |
| 2020/0051448 A1 | 2/2020 | Welch et al. |
| 2021/0020070 A1 | 1/2021 | Williams |
| 2021/0150937 A1 | 5/2021 | White |

FOREIGN PATENT DOCUMENTS

| | | |
|---|---|---|
| CN | 201845491 U | 5/2011 |
| CN | 201886681 U | 6/2011 |
| CN | 202373225 U | 8/2012 |
| CN | 202523292 U | 11/2012 |
| CN | 202549149 U | 11/2012 |
| JP | 2005227534 A | 8/2005 |
| WO | 2009097045 A1 | 8/2009 |
| WO | 2009149090 A2 | 12/2009 |
| WO | 2011051172 A1 | 5/2011 |
| WO | 2012003023 A1 | 1/2012 |
| WO | 2013029081 A1 | 3/2013 |
| WO | 2015027286 A1 | 3/2015 |
| WO | 2018126169 A1 | 7/2018 |

OTHER PUBLICATIONS

Chinese Office Action for Chinese Application No. 201580069082.8, dated Dec. 24, 2018, with translation, 22 pages.
Chinese Office Action for Chinese Application No. 201580069082.8, dated Sep. 12, 2019, with translation, 21 pages.
Entire patent prosecution history of U.S. Appl. No. 15/527,173, filed May 16, 2017, entitled "Medical Treatment Simulation Devices".
European Communication Pursuant to Article 94(3) for European Application No. 15 861 965.0, dated Apr. 8, 2019, 7 pages.
Extended European Search Report for European Application No. 15 861 965.0, dated Jun. 14, 2018, 8 pages.
Extended European Search Report for European Application No. 22 164 024.6, dated Aug. 11, 2022, 7 pages.
Final Office Action for U.S. Appl. No. 14/496,396, mailed Jul. 6, 2017, 15 pages.
Final Office Action for U.S. Appl. No. 15/661,529, mailed Dec. 7, 2017, 30 pages.
Gaumard Scientific Company, Advanced Patient Care Simulator S230.10. Male and Female Catheterization User Guide, 2012, pp. 1-16.
International Search Report and Written Opinion for International Application No. PCT/US2015/060889, dated Apr. 14, 2016, 9 pages.
International Preliminary Report on Patentability and Written Opinion for International Application No. PCT/US2015/060889, dated May 23, 2017, 8 pages.
Maternova, "Low-Cost Birth Simulator Kit", 2015, http://maternova.net.low-cost-birth-simulator-kit>, 1 page.
Non Final Office Action for U.S. Appl. No. 15/661,529, dated Aug. 23, 2017, 21 pages. .
Non Final Office Action for U.S. Appl. No. 15/661,529, dated Jul. 20, 2018, 20 pages. .
Non Final Office Action for U.S. Appl. No. 16/693,833, dated Jan. 14, 2022, 34 pages.
Notice of Allowance for U.S. Appl. No. 15/661,529, mailed Mar. 27, 2019, 16 pages.
Partial European Search Report for European Application No. 21 201 341.1, dated Feb. 8, 2022, 11 pages.
Vata, "Dehisced Wound Board", https://vatainc.com/product/dehisced-wound-board/, downloaded from the internet Mar. 31, 2021, 3 pages.
Vata, "Pat Pressure Injury Staging Model—0980", https://vatainc.com/product/pat-pressure-injury-staging-model/, downloaded from the internet May 5, 2021, 4 pages.
Vata, "Seymour II Wound Care Model—0910", https://vatainc.com/2019/04/26/vatas-seymour-ii-wound-care-model/, downloaded from the internet May 5, 2021, 3 pages.
Vata, "Skin Graft Wound Board", https://vatainc.com/product/skin-graft-wound-board/, downloaded from the internet Mar. 31, 2021, 2 pages.
Vata, "Wilma Wound Foot", https://vatainc.com/product/wilma-wound-foot/, downloaded from the internet May 5, 2021, 3 pages.
European Result of Consultation for European Application No. 15 861 965.0, dated Sep. 10, 2020. (4 pages).
Chinese Office Action for Chinese Application No. 201580069082.8, dated Mar. 27, 2020, with an English translation, (16 pages).
Chinese Office Action for Chinese Application No. 201580069082.8, dated Sep. 3, 2020, with an English translation, (11 pages).
Entire patent prosecution history of U.S. Appl. No. 16/693,833, filed Nov. 25, 2019, entitled, "Medical Treatment Simulation Devices".
Entire patent prosecution history of U.S. Appl. No. 14/466,027, filed Aug. 22, 2014, entitled, "Medical Treatment Simulation Devices".
Entire patent prosecution history of U.S. Appl. No. 14/496,396, filed Sep. 25, 2014, entitled "Medical Treatment Simulation Devices".
Notice of Allowance issued on Jul. 22, 2024, by the U.S. Patent and Trademark Office in U.S. Appl. No. 18/092,505. (68 pages).
Non Final Office Action for U.S. Appl. No. 17/213,640, dated Jun. 29, 2023. (31 pages).

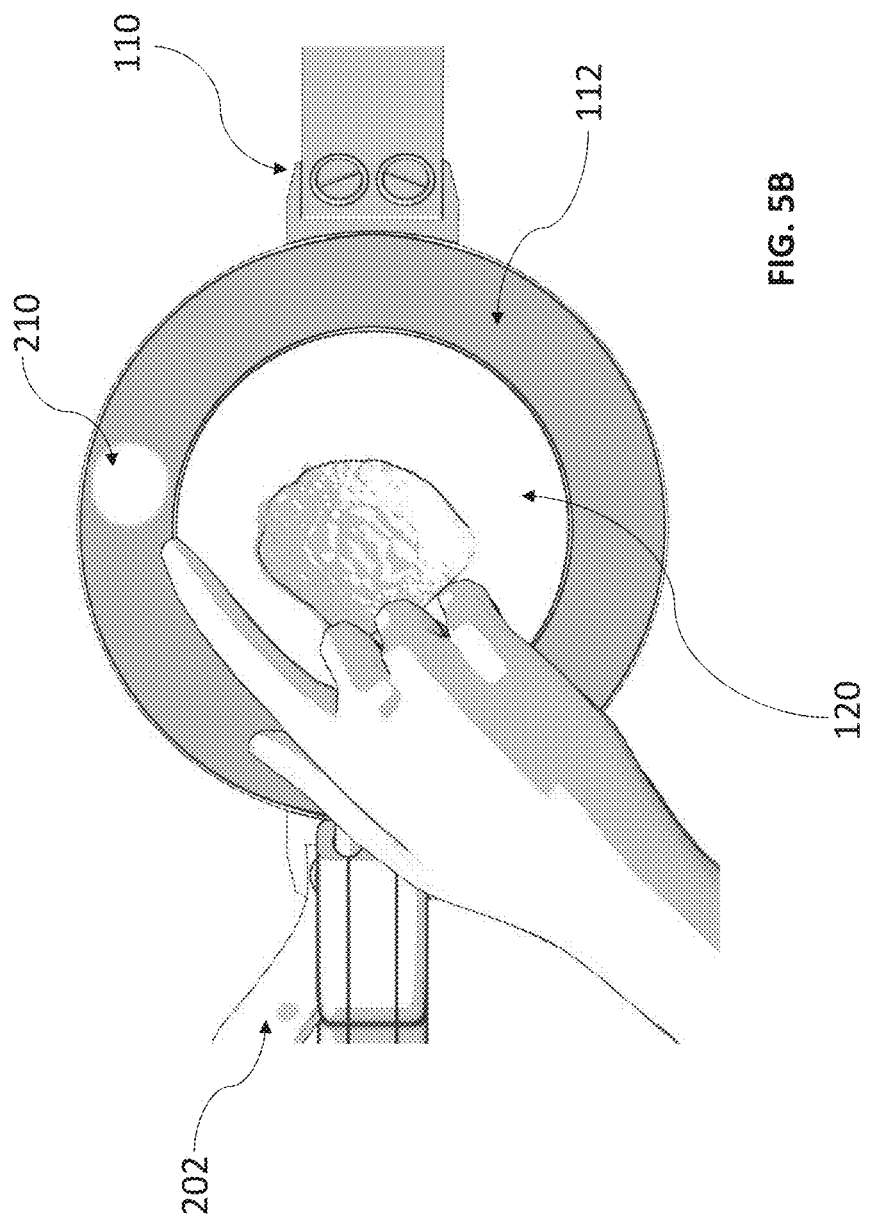

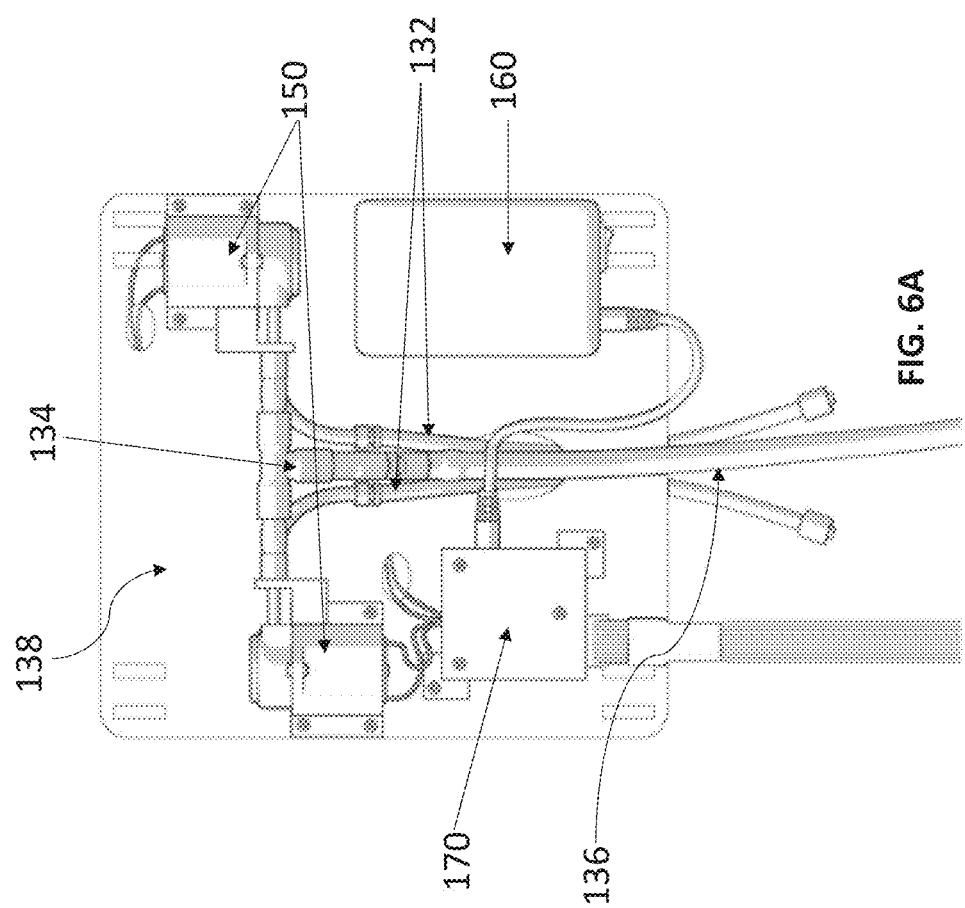

WEARABLE WOUND TREATMENT SIMULATION DEVICES

CROSS-REFERENCE TO RELATED APPLICATION

This application is a Continuation of U.S. patent application Ser. No. 17/213,640, filed Mar. 26, 2021, the entire content of which is incorporated by reference herein for all purposes.

FIELD OF THE INVENTION

The present invention relates generally to medical treatment simulations, and more particularly, to simulation devices for training care providers to manage and provide wound care and treatment.

BACKGROUND OF THE INVENTION

Conventionally, the training process for nursing or medical students related to patient care and treatment may employ mannequins or static models that do not simulate realistic conditions or provide realistic patient feedback. This lack of realistic conditions and feedback makes it difficult for nursing or medical students to gain the education and experience needed to perform proper wound treatments or care when working with actual patients. Accordingly, improved systems and devices are desired for training medical care providers to provide wound treatment.

SUMMARY OF THE INVENTION

Aspects of the present invention are directed to wound treatment simulation systems and devices.

In accordance with one aspect of the present invention, a wearable wound treatment simulation device is disclosed. The wound treatment simulation device includes a housing, a removable wound structure, at least one pump, and a power supply. The housing is configured to be secured to a subject, and the removable wound structure is at least partially provided therein. The removable wound structure has a top surface, a bottom surface, and at least one cavity to contain a wound fluid therein. The cavity is in fluid communication with the top surface. The pump is driven by the power supply to apply pressure to the wound fluid within the cavity. The application of pressure or force to the removable wound structure evacuates the wound fluid from the cavity of the wound structure to a portion of the top surface of the wound structure.

In accordance with yet another aspect of the present invention, a method for operating a wearable wound treatment simulation device is disclosed. The method includes pumping a wound fluid into a cavity in a removable wound structure with a pump. The wound structure is configured to be securable to a subject and has a top surface adapted to give an appearance and texture of an injury. The cavity is in fluid communication with a top surface of the wound structure. The method also comprises detecting an application of force or pressure to the wound structure and determining whether the detected application of force or pressure exceeds a predetermined threshold. Further, when the detected application of force or pressure exceeds the predetermined threshold, an actuator is activated to provide haptic feedback to the subject.

In accordance with yet another aspect of the present invention, a wearable wound treatment simulation device is disclosed. The wound treatment simulation device includes a housing, a removable wound structure, and an overlay. The housing is configured to be secured to a subject, and the removable wound structure is at least partially positioned therein. The wound structure has a top surface and an outer periphery, the top surface of the wound structure being adapted to give an appearance and texture of an injury. The overlay circumscribes the outer periphery of the wound structure. In addition, the overlay comprises one or more thermochromic pigments adapted to change in color based on a predetermined temperature threshold.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 5B is a diagram illustrating an overlay of the wound treatment simulation device of FIG. 5A;

FIG. 6A is an image illustrating a pump and power supply layout of the wound treatment simulation device of FIG. 1;

DETAILED DESCRIPTION OF THE INVENTION

Aspects of the invention are described herein with reference to simulating specific medical treatments. It will be understood by one of ordinary skill in the art that the example devices described herein may be used to simulate treatment of a variety of medical conditions, and are not limited to any particular treatment disclosed herein. Other medical treatments suitable for simulation with the disclosed devices will be known to one of ordinary skill in the art from the description herein.

The example devices disclosed herein may be particularly suitable for providing an enhanced level of realism and/or feedback to the treatment provider relative to conventional training devices. Haptic feedback may be provided to the simulated treatment subject during the simulated treatment in order to encourage the subject to mimic realistic patient reactions, and thereby reinforce proper treatment techniques. Likewise, this feedback may be provided to correct treatment errors that the care provider may otherwise struggle to detect during the simulated treatment. The provision of feedback using the example device of the present invention may desirably improve the ability of treatment providers to comfortably and effectively treat patients.

It will be appreciated that throughout this specification the term wound or injury is to be broadly construed as any damaged region of tissue where a wound fluid may or may not be discharged. Further, the term wound or injury includes open and closed wounds in which skin is torn, cut or punctured or where trauma causes a contusion, or any other superficial or other conditions or imperfections on the skin of a patient. Examples of such wounds include, but are not limited to, large or incisional wounds, either as a result of surgery or trauma, mild wounds, acute wounds, lacerations, abrasions, contusions, or the like. Likewise, the term treatment or care provider is to be broadly construed to include any provider of wound care, management or treatment. The term may include trainees and professionals in the field of medicine, as well as non-health care professionals.

Figure 1:
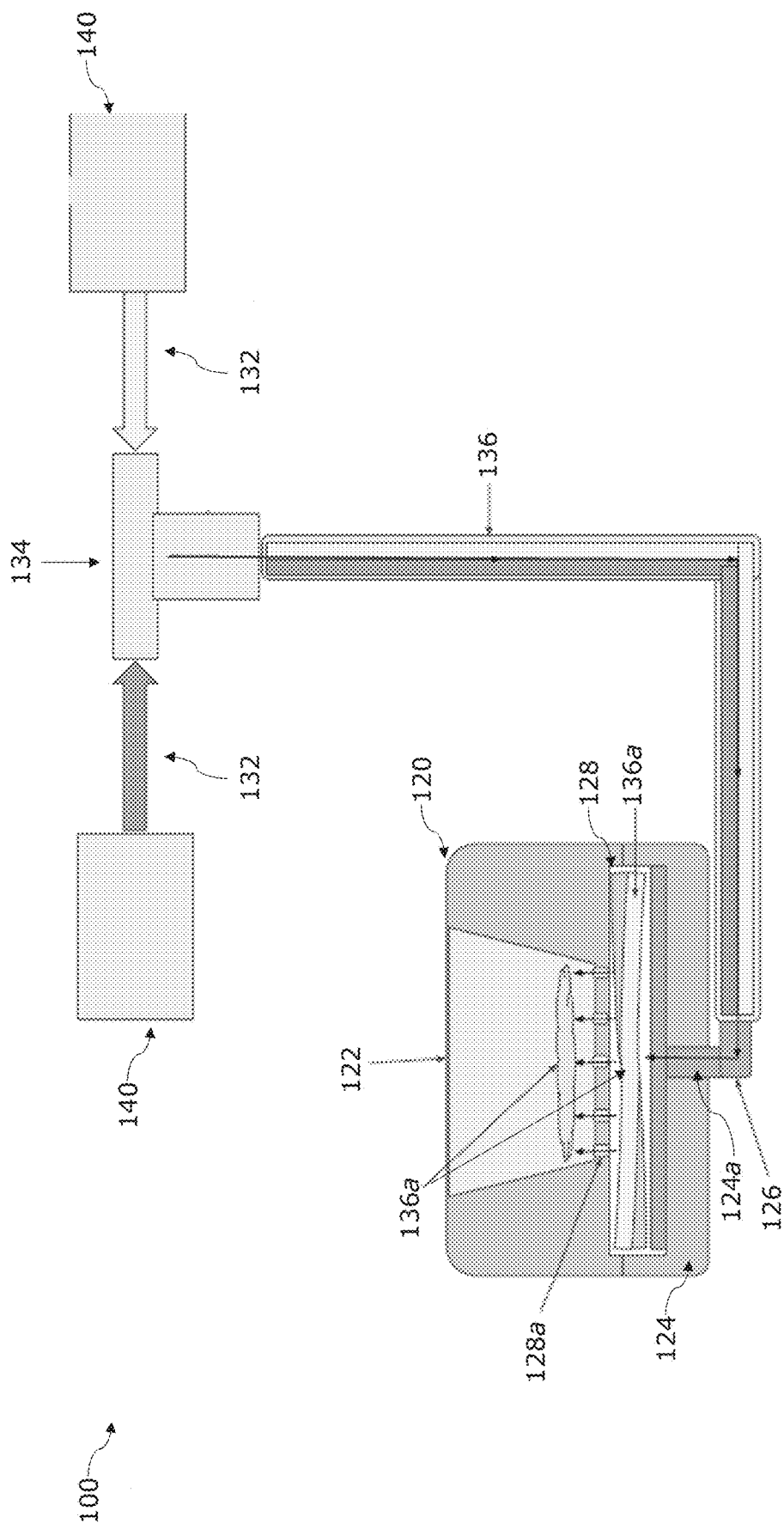
FIG. 1 is a diagram illustrating an example wound treatment simulation device in accordance with aspects of the present invention.

With reference to the drawings, FIG. 1 illustrates an example wound treatment simulation device 100 in accordance with aspects of the present invention. Device 100 is usable to train medical care providers to treat patients by enabling the performance of simulated medical treatment. The device 100 can be adjusted to simulate realistic conditions of wound treatment in various environments (e.g. hospital or other sterile settings, trauma or critical care sites, wilderness, etc.). In general, device 100 can include a housing 110, a removable wound structure 120, and one or more tubes 132, 136. Additional details of device 100 are described below.

Figure 2:
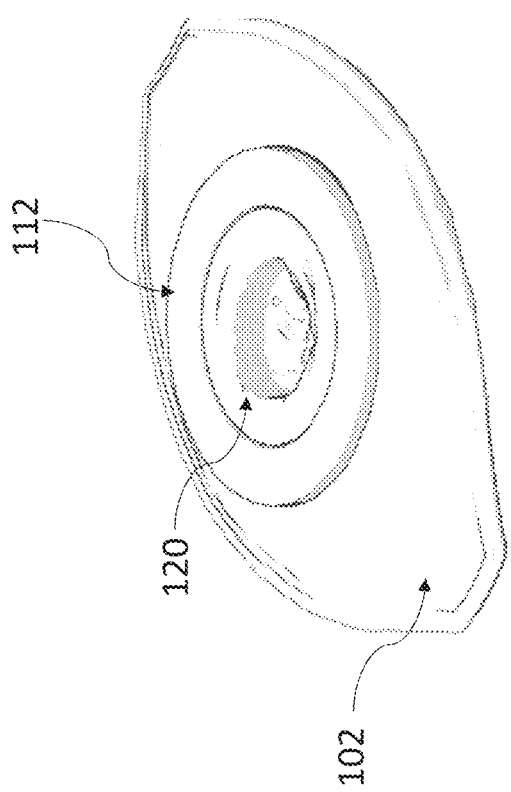
FIG. 2 is an image illustrating an example top surface layer of the wound treatment simulation device of FIG. 1.

Housing 110 houses components which simulate the wound, including the removable wound structure 120. In some examples, housing 110 incorporates or is connected to a number of separate components designed to best simulate a wound for treatment. As shown in FIG. 2, device 100 may include a durable material 102 covering the housing 110 for attaching the device 100 to the subject. Material 102 may be useful to conceal components of device 100, such as housing 110 and/or tubes 132/136, and thereby increase the realistic appearance of device 100.

Figure 3:
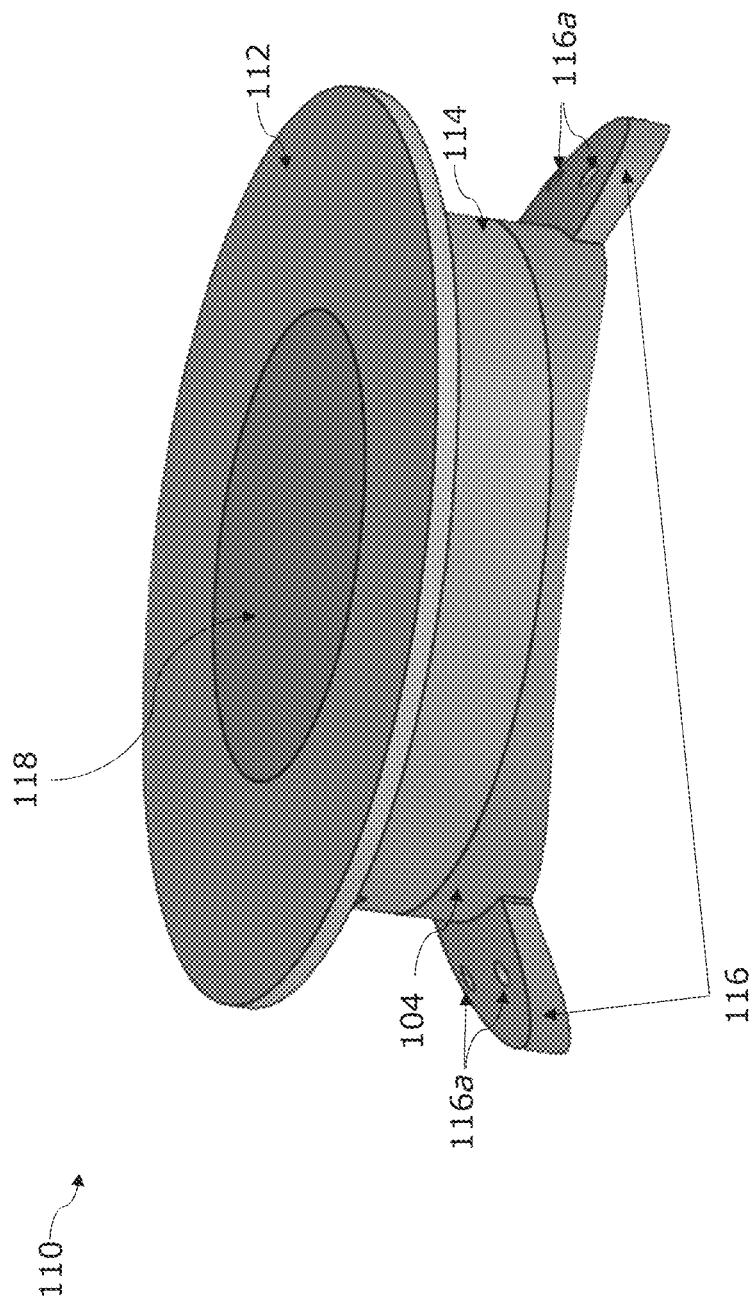
FIG. 3 is a diagram illustrating components of an example housing of the wound treatment simulation device of FIG. 1.

Housing 110 can be formed from one or more structures which together define a cavity or space, with the wound structure 120 being at least partially (and removably) positioned within the space in the housing 110. In the example of FIG. 3, the housing 110 includes multiple structures which together define the space, including an overlay 112, an arch 104, and rigid ring 114. The operational components of device 100 (e.g. sensors, tubes, etc.) are provided within the housing 110 and/or beneath material 102 of device 100, which thereby provides protection for these components and helps conceal wiring and other items.

Housing 110 is configured to be secured to a subject who is playing the role of the patient. The material 102 of housing 110 includes one or more attachment mechanisms, including but not limited to a pair of straps configured to encircle the subject's torso or limb. Straps may be usable to secure device 100 to the subject during the simulated treatment. Housing 110 is configured to receive a removable wound structure 120 therein, e.g., within a space 118 circumscribed by ring 114. It will be understood that the shape and size of housing 110 shown in FIG. 3 is merely illustrative of one configuration and may vary depending on the size and shape of the wound structure 120 used and/or the type of medical condition or wound treatment to be simulated. For example, ring 114 may vary in diameter or height based on the size and shape of the wound structure 120. Having a ring 114 that is adjustable to accommodate the wound structure 120 may be desirable to allow for easy removal and replacement of several wound structures 120 of varying sizes and shapes over the course of one or more training or educational sessions.

In the example shown in FIG. 3, ring 114 may be further adapted to be removably connected to the arch 104 to form housing 110. Ring 114 and arch 104 may be attached, for example, by straps, screws, hook-and-loop fasteners, anchors, adhesives, or double-sided tape, or combinations thereof. Other suitable attachment mechanisms will be known to one of ordinary skill in the art from the description herein. Arch 104 may also include flanges 116 having a plurality of apertures 116a for receiving fastening means, such as screws (not shown), for securing housing 110 within material 102. Optionally, the ring 114 and arch 104 may be integrally formed as a single body of unitary construction that is separate from the overlay 112. In another example, the overlay 112, ring 114, and arch 104 may all be integrally formed as a single body of unitary construction.

The overlay 112 has an annular shape configured to circumscribe an outer periphery of the ring 114, thereby defining the space 118 configured to receive and/or reveal at least a portion of the wound structure 120. The overlay 112 may have a diameter selected based on a diameter of the ring 114 as well as the shape and size of the wound structure 120 and components thereof.

Figure 4B:
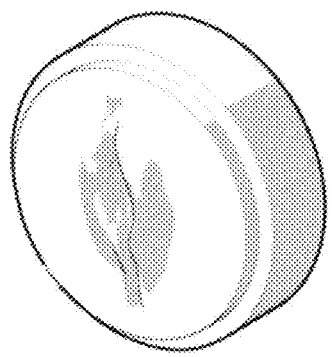
FIG. 4A-4D depict images illustrating examples of a removable wound structure of the wound treatment simulation device of FIG. 1.
Figure 4D:
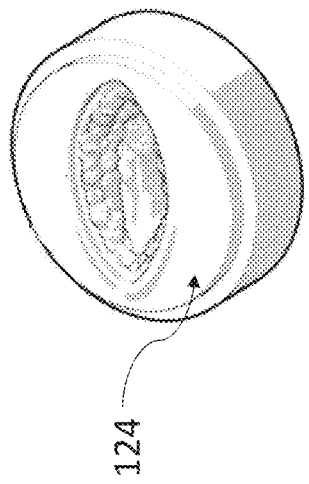
Figure 4A:
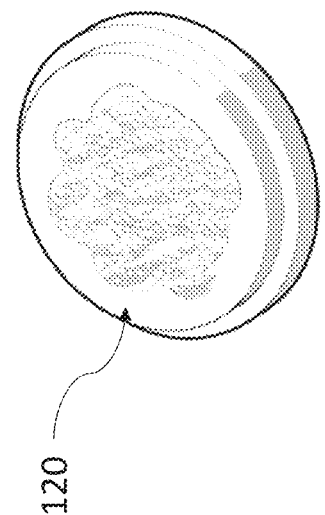
Figure 4C:
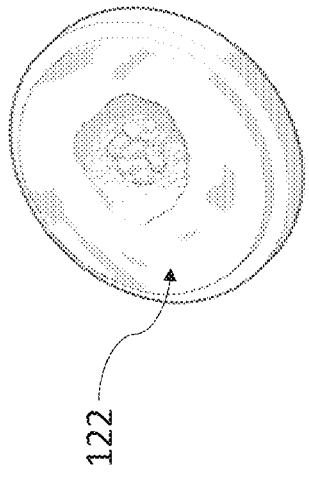

As best seen in FIGS. 4A-4C, the removable wound structure 120 is preferably made of material intended to mimic the patient's skin. The material is customizable in coloring and texturing to match a variety of skin tones. In one example, the material selected to simulate the look and feel of a patient's skin comprises silicone. Other suitable materials for use in simulating a patient's skin will be generally known to one of ordinary skill in the art from the description herein. Furthermore, it will be understood that the selection, appearance, and thickness of layers comprising the wound structure 120 as shown in FIGS. 4A-4D is provided for the purpose of illustration, and is not intended to be limiting.

Removable wound structure 120 is provided on and/or at least partially within housing 110. Wound structure 120 is designed to simulate a variety of wounds or injuries demonstrable on an actual patient, including but not limited to pressure injuries (FIG. 4A), surgical dehiscence (FIG. 4B), and larger lacerations (FIGS. 4C-4D). Accordingly, wound structure 120 can be positioned on the patient's torso or limb of interest based on the simulated medical condition or treatment.

In one example, wound structure 120 includes a top surface 122 and a bottom surface 124, with one or more tubes 132/136 attached thereto. As shown in FIGS. 4A-4D, the top surface 122 is configured to give an appearance and texture of an injury or wound based on the simulated wound treatment. Although FIGS. 4A-4D depict examples of wounds or injuries, it should be understood that the wound structure 120 may include any combination of types of wounds or injuries, without departing from the scope of the invention. Further, the appearance and texture of wound structure 120 is complex and may be modified to account for different tissue types based on the wound treatment to be simulated, including bone, tendon, cartilage, blood vessels, skin, fat, as well as any other organs or other anatomical structures.

In the example of FIG. 1, at least a portion of the top surface 122 is permeable. For example, as seen in FIG. 1, the top surface 122 can be provided with one or more openings 128a, such as holes, slits, or channels, to allow the flow of fluids from within wound structure 120 to the simulated wound site (e.g. top surface 122), as well as the transmittal of negative pressure applied to the wound site to fluids within the wound structure 120. Furthermore, the top surface 122 may simulate a wound type having multiple regions or areas that simulate one or more stages of wound healing. For example, a portion of the top surface 122 may be permeable as discussed above, to simulate a region of the wound structure 120 that is bleeding heavily, whereas another separate and distinct portion of the top surface 122 may be configured to simulate, for example, dryness or various other conditions of the wound site (e.g. inflammation). In this way, a treatment provider may be trained to identify and evaluate various conditions regarding the wound structure 120, such as severity of the wound, areas where various levels of pressure may be advantageously applied, and any other characteristics that may affect the closure and/or healing of a wound or the overall health of the patient.

To simulate the discharge of fluids to the top surface 122, the top surface 122 is in fluid communication with a cavity 128 within wound structure 120. The cavity 128 is configured to contain wound fluid 136a (discussed further below) within the removable wound structure 120. In some examples, cavity 128 is in communication with an opening 124a of the bottom surface 124 of wound structure 120. As seen in FIG. 1, the opening 124a may be adapted to connect to one or more input tubes 132/136 defining a fluid flow path from one or more fluid containers 140 (discussed further below) to the cavity 128.

In one example, the one or more tubes 132/136 include a pair of input tubes 132 leading to a connector 134, and an output tube 136 extending from the connector 134. An example layout of the one or more tubes 132/136 is shown in FIG. 6A. As seen in FIGS. 6A and 7, the input tubes 132 may be configured to each deliver one or more simulated biological fluids 132a, 132b, e.g. exudate, blood, etc., from fluid containers 140a, 140b storing the same, to the wound structure 120 in order to simulate a wound fluid 136a. Specifically, the one or more input tubes 132 comprises a first input tube and a second input tube connected to respective first 140a and second 140b containers.

As shown in FIG. 7, containers 140 may be adapted to store fluid having a viscosity corresponding to one or more simulated biological fluids 132a, 132b found in a patient. In one example, the first container 140a stores a first simulated biological fluid 132a having a first viscosity and the second container 140b stores a second simulated biological fluid 132b having a second viscosity that is different from the first viscosity. In operation, the first container 140a stores simulated exudate (e.g. pus) during the simulated wound treatment and the second container 140b stores simulated blood during the simulated wound treatment. For example, the simulated exudate 132a and blood 132b may be each formed from a combination of water and one or more viscous gels, lubricants, or dyes to achieve the desired viscosity, flow, and color to simulate exudate and blood, respectively. The first and second fluid containers 140a, 140b are each coupled to the one or more input tubes 132 in order to provide the simulated exudate and blood 132a, 132b, respectively, to the output tube 136, which is coupled to the connector 134 on one end and to the wound structure 120 on the other end.

The input tubes 132 are respectively coupled to one or more pumps 150 for pushing fluid 132a, 132b through the one or more input tubes 132 into the output tube 136 during the simulated treatment of the patient. The one or more pumps 150 may be driven by a common power supply 160, as shown in FIG. 6A, or by individual power supplies. In one example, the one or more pumps 150 are peristaltic pumps adapted to apply pressure to the respective simulated biological fluid 132a, 132b in the one or more containers 140 in order to cause the respective simulated biological fluid 132a, 132b to flow into and through the one or more input tubes 132. In operation, the first simulated biological fluid 132a is pumped through the first input tube and the second simulated biological fluid 132b is pumped through the second input tube. As illustrated diagrammatically in FIG. 1, the first and second fluids 132a, 132b may be at least partially immiscible when they are combined to form the wound fluid 136a that flows through the output tube 136 and into the cavity 128 of the wound structure 120. This immiscibility may desirably improve the realism of the simulated wound treatment by better simulating wound discharge. The one or more pumps 150 may further apply pressure through output tube 136 to the wound fluid 136a in cavity 128, so that the wound fluid 136a contained in the cavity 128 of the wound structure 120 is evacuated through openings 128a to a portion of the top surface 122 of the wound structure 120 during the simulated wound treatment.

Peristaltic pumps may be particular suitable as pumps 150, inasmuch as they can prevent negative pressure applied to the wound (e.g., during treatment involving Vacuum-Assisted Closure (VAC) of the wound) from being transmitted to containers 140. Nonetheless, while peristaltic pumps are shown in FIG. 6A, it will be understood that other structures may be utilized in connection with the one or more containers 140 to cause one or more simulated biological fluids 132a, 132b to flow into and through input tubes 132, output tube 136, and the wound structure 120. Suitable pumps, such as hand pumps, for use with the fluid containers will be known to one of ordinary skill in the art from the description herein.

Finally, the pumps 150 may be electrically coupled to and controlled by microprocessor 170, as shown in FIG. 6A. While the microprocessor 170 is wired to the one or more pumps 150 in FIG. 6A, it should be understood that the microprocessor 170 may also be wirelessly connected. Through the microprocessor 170, a trainer of the care provider may manually or automatically control the release and/or flow rate of wound fluid 136a into cavity 128 and/or out of cavity 128 to the top surface 122 of the wound structure 120 during the simulated wound treatment. For example, the trainer of the care provider may manually or automatically provide continuous or intermittent pressure via the pumps 150 to cause the one or more simulated biological fluids 132a, 132b to flow into and through tubes 132/136 and the wound structure 120, based on the needs of the wound being treated or the wound treatment being simulated. The pressure can be adjusted within a range that has been demonstrated to simulate realistic conditions of wound fluid discharge.

In some examples, the one or more containers 140, the tubes 132/136, pump 150, power supply 160, and microprocessor 170 are external to or located outside of the housing 110, in order to provide simplified control over the pumping of fluid out of the one or more containers 140. In these examples, output tube 136 is coupled to the wound structure 120 and exits the housing 110 in order to be in communication with the one or more of container 140 and pump 150. Further, the pump 150, power supply 160, microprocessor 170, may all be mounted on a plate or substrate 138 (FIG. 6A). Plate 138 includes a plurality of openings through which the one or more tubes 132/136 are looped through in order to establish connection with one or more of the pump 150, power supply 160, and microprocessor 170, while maintaining fluid communication with the one or more containers 140.

When external to housing 110, the fluid components (e.g. tubes 132/136, containers 140, pumps 150) and/or electrical components (e.g. pumps 150, power supply 160, microprocessor 170) of device 100 may be housed in one or more separate housings adjacent to, suspended over, or worn by the patient, or may otherwise be concealed from the medical treatment provider, in order to enhance the realism of the simulation. It will be understood, however, that in other examples, housing 110 may be sized or configured to house pump 150 and/or power supply 160 in addition to wound structure 120, in order to directly apply pressure to wound fluid in wound structure 120. In these examples, tubes 132/136 and containers 140 may be omitted.

Although the example of FIG. 1, as described above, depicts fluid components (e.g. cavity 128, tubes 132/136, containers 140, pumps 150) and/or electrical components (e.g. pumps 150, power supply 160), it should be understood that the fluid components and/or electrical components may be omitted from device 100. In other words, the cavity 128; the tubes 132/136; the simulated biological fluids 132*a*, 132*b*; the containers 140; the pumps 150; and the power supply 160 may each be an optional component of device 100. In these examples, the top surface 122 of the simulated wound structure 120 is adapted to give an appearance and texture of an injury, but top surface 122 is not permeable (FIG. 4A). In such examples, device 100 may include other of the components identified herein (such as sensors 180, feedback device 190, or fluid passageway 202) to support the simulation of realistic wound treatment.

Figure 6B:
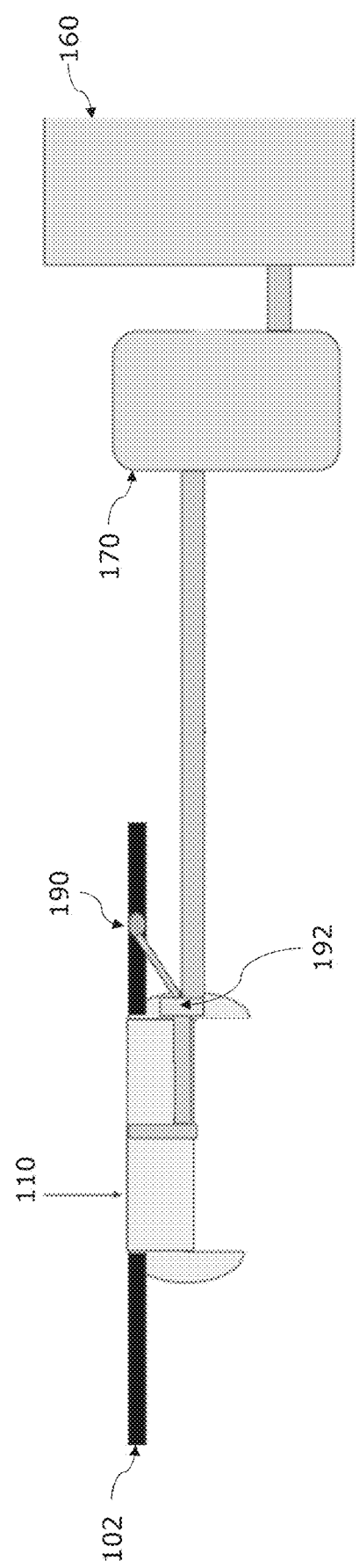
FIG. 6B is a diagram illustrating an example sensor layout of the wound treatment simulation device of FIG. 1.
Figure 6C:
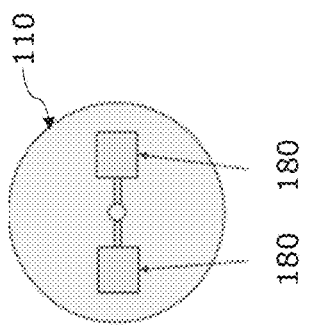
FIG. 6C is an image showing a top view of the wound treatment simulation device of FIG. 1, with the wound structure removed.
Figure 7:
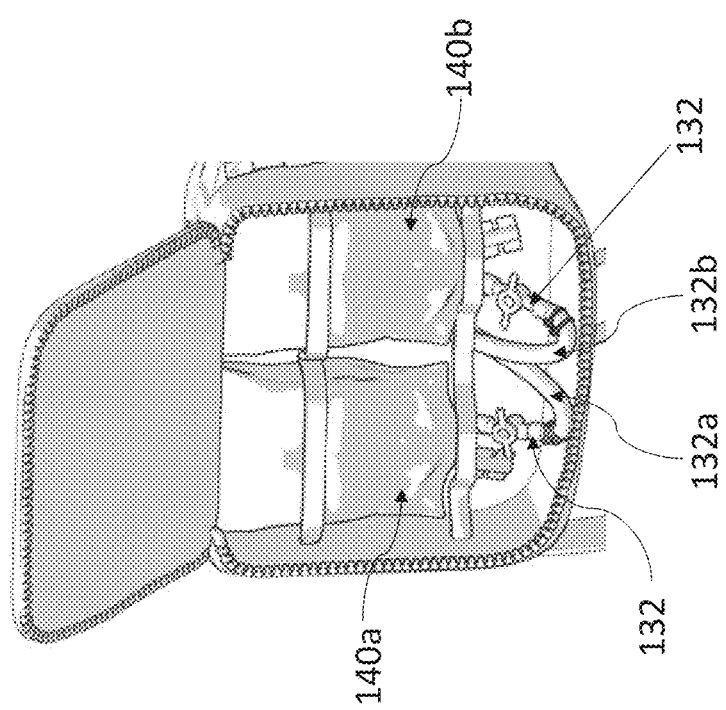
FIG. 7 is an image illustrating a fluid container layout of the wound treatment simulation device of FIG. 1.
Figure 8:
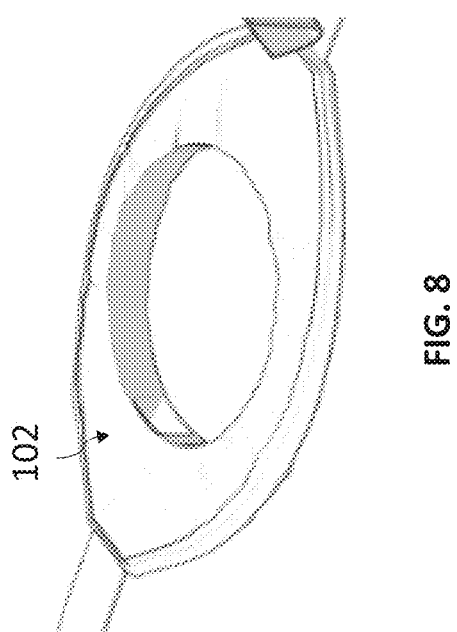
FIG. 8 is an image illustrating another component of the example housing of the wound treatment simulation device of FIG. 1.

Referring now to FIGS. 6B-6C, one or more sensors 180 are mounted to the housing 110. As seen in FIG. 6C, the sensor 180 is mounted on the arch 104 and configured to be disposed beneath the wound structure 120 when the wound structure is received within the housing 110. Sensor 180 detects any application of force or pressure to the wound structure 120 during the simulated treatment of the subject. In one example, the sensor 180 includes a force sensor electrically connected to microprocessor 170 and configured to detect an application of pressure or force on wound structure 120 during the simulated treatment. Preferably, the force sensors 180 used are force-sensitive resistors (FSRs). FSRs are dynamic resistors that have nearly infinite resistance when no force is applied. The resistivity of the FSR decreases, non-linearly, as the force applied increases. As illustrated in FIG. 6B, microprocessor 170 may detect a voltage across the sensors 180 and convert this voltage value into a detection of an applied force or pressure on wound structure 120. The types and locations of sensors are provided for the purposes of illustration in FIGS. 6B-6C, and are not intended to be limiting. Suitable pressure or force sensors for use as described above will be readily known or identifiable from the description herein. It will be understood that any combination of sensors may be used, and that additional types and locations of sensors may be used, without departing from the scope of the invention. Other possible sensors for use in device 100 would be known to one of ordinary skill in the art.

As shown in FIG. 6B, the microprocessor 170 is in communication with sensors 180 and a feedback device 190. Microprocessor 170 may store (e.g., in an associated memory) one or more predetermined force or pressure thresholds for use in controlling a feedback element, such as feedback device 190. Microprocessor 170 processes the information detected by sensors 180, and determines whether the sensed manipulations (force, pressure, etc.) exceed predetermined thresholds stored by microprocessor 170. If microprocessor 170 determines that any threshold is exceeded, it sends signals to operate feedback device 190 to provide feedback to the subject wearing device 100.

In one example, when a predetermined force threshold is exceeded, haptic feedback (e.g., vibration feedback) may be provided to the subject wearing device 100 via the feedback device 190. Haptic feedback may be provided to the subject via an actuator or vibrating motor for use as feedback device 190. Suitable haptic feedback generators for use as feedback device 190 would be known from the description herein. Feedback device 190 may alternatively or additionally be configured to provide other types of feedback, such as auditory feedback.

The feedback device 190 may preferably be positioned outside of and separately from the housing 110, with sufficient separation that the haptic feedback is not transmitted to the housing 110 and the treatment provider performing the simulated wound treatment cannot sense that haptic feedback has been provided to the subject. In some examples, feedback device 190 may be positioned on or within a strap used to secure device 100 to the subject. In other examples, feedback device 190 may be coupled to or concealed within material 102, at a location removed from housing 110.

In one example operation, a vibratory actuator used as feedback device 190 creates haptic feedback or vibration that can be felt by the subject during the simulated treatment. Specifically, when the applied force or pressure exceeds a predetermined threshold, microprocessor 170 controls actuator 190 to provide haptic feedback to the subject based on the applied force or pressure detected by sensor 180. Microprocessor 170 may employ a single threshold/feedback signal, or may utilize multiple thresholds, each associated with a different type of feedback signal (e.g., pulsed or steady feedback, or predetermined series or sequence of pulses as feedback).

Feedback may be used as a signal to cause the subject to respond to the simulated treatment in a predetermined way. For example, feedback may be provided to the patient when the force on wound structure 120 exceeds a predetermined limit. In actual patients, excessive force on a wound can be a source of discomfort. Accordingly, the detection of force on wound structure 120 above the predetermined threshold may be used to signal the subject to simulate discomfort, which may be desirable in order train care providers to limit excessive force on structure and prevent discomfort in actual patients. The haptic feedback prompts the subject wearing device 100 to simulate or act in the role of a patient who has experienced discomfort from an application of excessive force or pressure to a wound site. The actions or statements performed by the subject may be predetermined by the subject or by one or more persons responsible for the simulation, e.g. a trainer of the care provider. This feedback is preferably provided in real time, so that the subject can simulate the role of the patient as the detected force or pressure is applied to the device 100.

In one preferred example, as discussed above, the feedback device 190 is a haptic feedback generator, such as an actuator or vibrating motor. In this example, a further microprocessor 192 may be configured to actuate the vibrating motor 190 to provide a haptic feedback to the subject upon detection of the force or pressure beyond a predetermined limit. It will be understood that although FIG. 6B diagrammatically illustrates that multiple microprocessors 170/192 may be used to operate the device 100, a single microprocessor may be used, without departing from the scope of the invention.

Device 100 is not limited to the above-described components, but can include alternate or additional components as would be understood to one of ordinary skill in the art in view of the examples below.

As discussed above, housing 110 includes the ring 114, the arch 104, and the overlay 112. More specifically, overlay 112 of the housing 110 is configured to circumscribe an outer periphery of wound structure 120. As one possibility, overlay 112 and the wound structure 120 may be integrally formed as a single body of unitary construction. In another example, the overlay 112 may be removable from the wound structure 120 following use of device 100. This may be preferable in order to allow the overlay 112 to be removed and separated from wound structure 120 for cleaning, replacement, or based on the type of medical condition to be simulated. As with the material of the wound structure 120, overlay 112 is formed from materials that mimic the feel of the skin of the subject, such as silicone. Other suitable materials for forming overlay 112 will be known to one of ordinary skill in the art from the description herein.

Figure 5A:
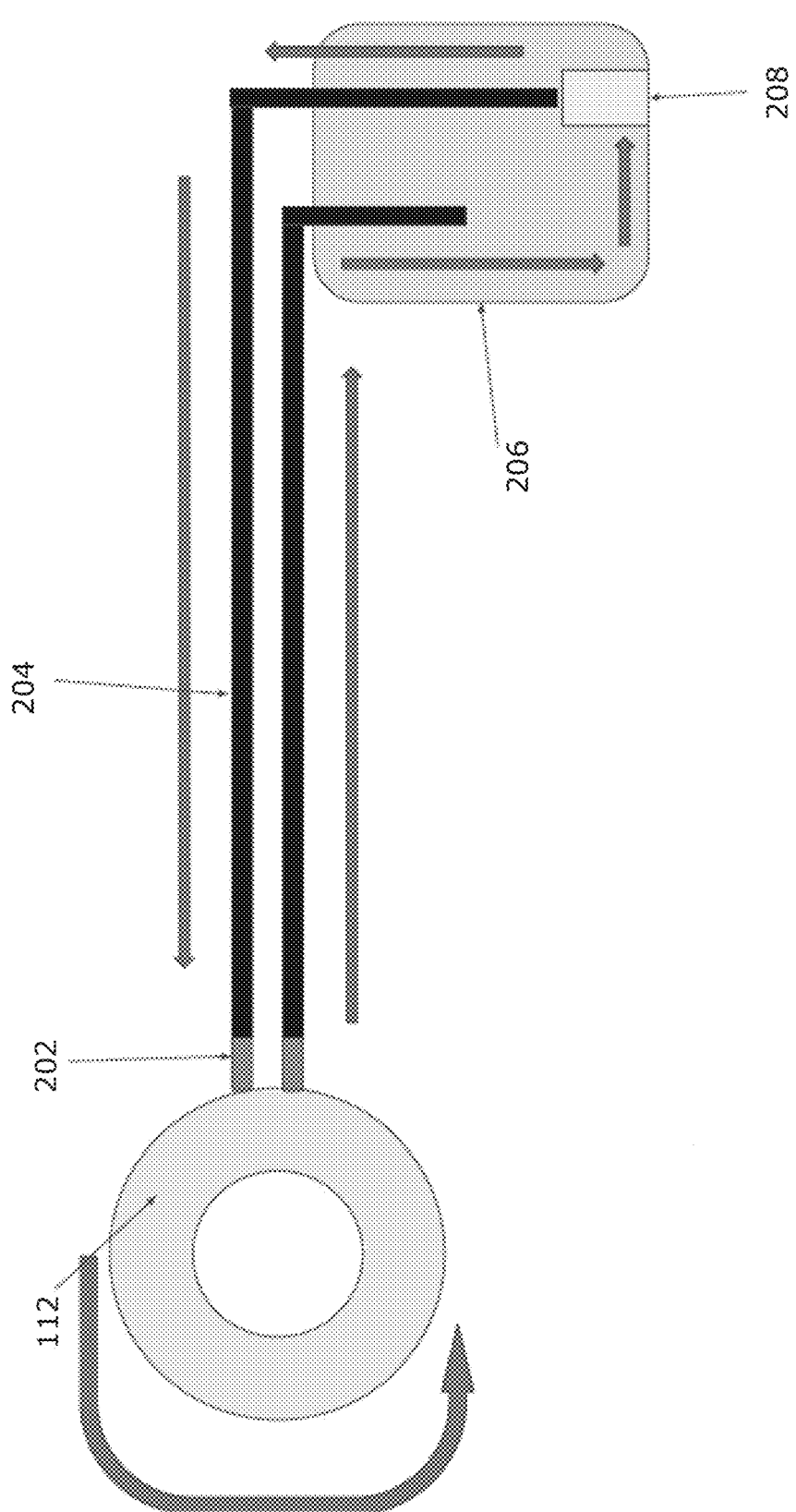
FIG. 5A is a diagram illustrating a fluid flow path of the wound treatment simulation device of FIG. 1.

Referring now to FIGS. 2 and 5A-5B, the overlay 112 and/or ring 114 incorporates a fluid passageway 202 embedded therein and through which fluid travels from a source 206 external to the overlay 112. An example layout of the overlay 112 and fluid passageway 202 is provided in FIG. 5A. To accommodate fluid passageway 202, overlay 112 may have one or more channels defined therein for receiving one or more tubes forming the fluid passageway 202. Alternatively or additionally, ring 114 may define one or more channels for receiving one or more tubes forming the fluid passageway 202. In this configuration, the one or more channels of overlay 112 and the one or more channels of ring 114 together form a portion of the fluid passageway 202 adapted to receive one or more tubes, such as tubes 204. In other examples, fluid passageway 202 may be entirely embedded within overlay 112 or ring 114.

The fluid passageway 202 desirably extends along the shape of overlay 112, e.g., in an annular or circular track. Fluid passageway 202 may further include portions that partially extend radially outward to be coupled to the one or more tubes 204 through which fluid can flow during the simulated wound treatment. The one or more tubes 204 have one end coupled to a fluid container or reservoir 206 that is adapted to store the fluid. The one or more tubes 204 may also be coupled to a pump 208 configured to drive of the fluid through tubes 204 and into the overlay 112. In some examples, the one or more tubes 204, container 206, and pump 208 are external to or located outside of the overlay 112 and housing 110 in order to provide simplified control over the pumping of fluid out of the container 206.

Fluid passageway 202 is provided as a heat exchanger, to transmit heat or cold from the fluid therein to overlay 112. To this end, fluid passageway 202 in one example comprises copper tubing, but other suitable materials for use as promoting heat transfer and forming the fluid passageway 202 would be known to one of ordinary skill in the art.

In operation, the container 206 stores fluid having a specific temperature during the simulated wound treatment. The simulated fluid may be, for example, water. The fluid travels through the fluid passageway 202 and into the overlay 112 in order to manipulate the temperature of the overlay 112. To this end, the overlay 112 comprises one or more thermochromic pigments adapted to change in color based on a predetermined temperature threshold, e.g. a range of 60° F. to 75° F. The one or more thermochromic pigments enable the overlay 112 to visually depict when pressure or force is applied by human hands onto device 100. For example, as cold water travels through the fluid passageway 202, the temperature of the overlay 112 decreases, and the one or more thermochromic pigments changes color accordingly, e.g. to a darker shade. When force or pressure is applied to the overlay 112 by human hands, the overlay 112 is heated to a temperature which corresponds to the standard temperature of human hands, thereby changing the color or shade of the one or more thermochromic pigments of the overlay 112, e.g. to a lighter shade. This "blanching" effect is illustrated in FIG. 5B where a portion 210 of the overlay 112 which came in contact with human hands during the simulated treatment is in a different, e.g. lighter, shade when compared to the shade of other portions of the overlay 112. In this way, the care provider may be trained to evaluate where force or pressure to the wound structure 120 is properly applied during treatment.

Figure 9:
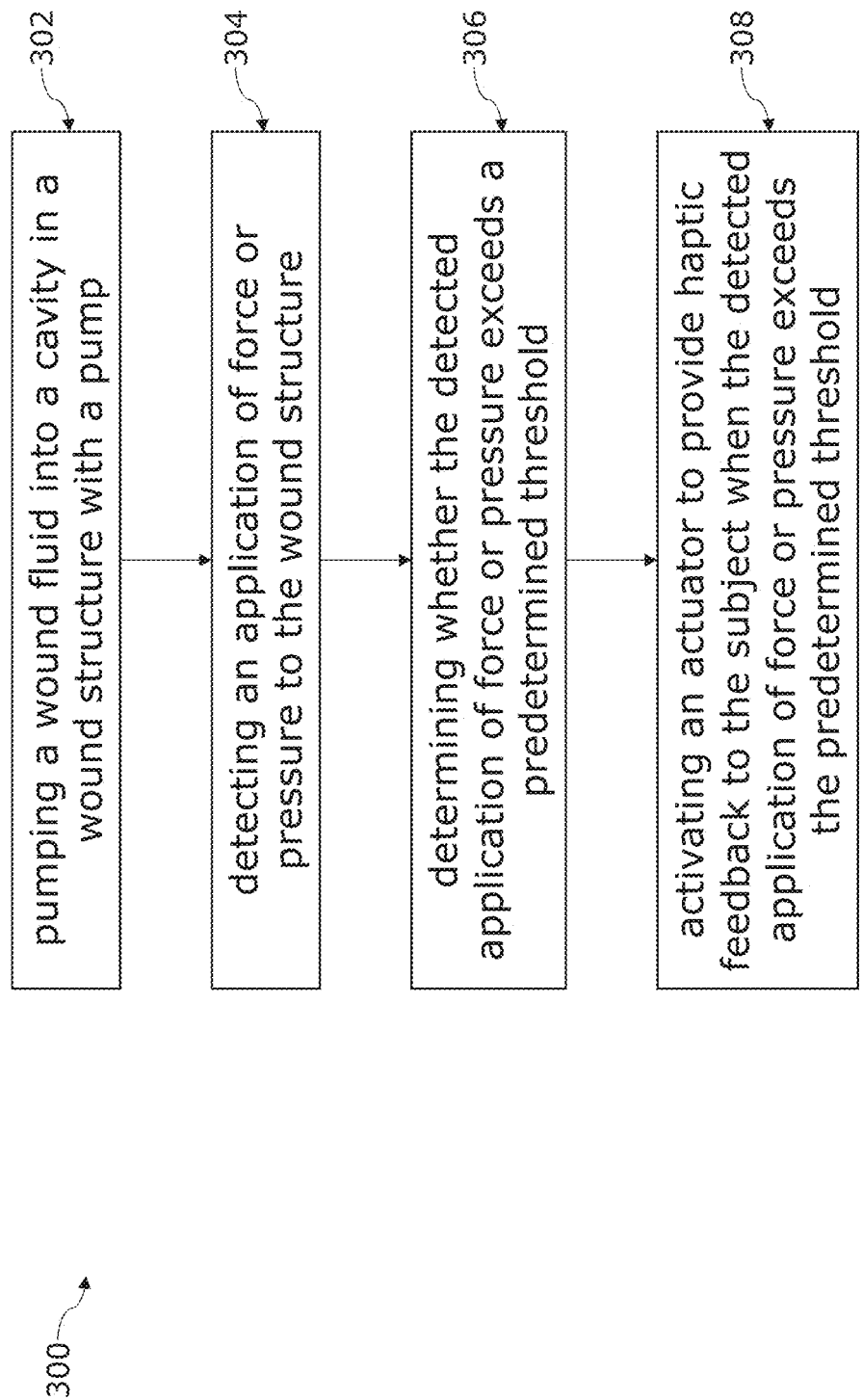
FIG. 9 is a diagram illustrating an example method of operating the wound treatment simulation device of FIG. 1.

Referring now to FIG. 9, a method 300 of operating the wound treatment simulation device 100 is also provided. The method 300 includes steps of pumping wound fluid, detecting an application of force, and activating an actuator based on the application of force. Additional details of method 300 are set forth below with respect to the elements of device 100.

In step 302, wound fluid is pumped into a cavity in a wound structure. In an example, wound structure 120 is configured to be securable to a subject. The wound structure 120 includes a top surface 122 adapted to give an appearance and texture of an injury or wound and a cavity 128 formed therein. Specifically, the cavity 128 is in fluid communication with the top surface 122 of the wound structure 120. Step 302 includes pumping wound fluid 136a into the cavity 128 of the wound structure 120 with one or more pumps 150.

In step 304, an application of force or pressure to the wound structure is detected. In an example, sensors 180 detect an application of force or pressure to the top surface 122 of wound structure 120.

In step 306, it is determined whether the application of force or pressure exceeds a predetermined threshold. In an example, microprocessor 170 detects a voltage across sensors 180 and converts this voltage value into a detection of an applied force or pressure.

In step 308, a feedback device is actuated based on the applied force or pressure. In an example, microprocessor 170 actuates feedback device 190 when the detected application of force or pressure exceeds the predetermined threshold.

Method 300 may further include modifying an operation of the one or more pumps 150 in response to detecting the application of force or pressure to the wound structure 120. Additionally, method 300 may include combining a first simulated biological fluid 132a having a first viscosity and a second simulated biological fluid 132b having a second viscosity that is different from the first viscosity to generate the wound fluid 136a, such that the first and second biological fluids 132a, 132b are at least partially immiscible when combined to form the wound fluid 136a.

As described above, the wound structure 120 may include an overlay 112 having one or more thermochromic pigments adapted to change in color based on a predetermined temperature threshold. In these examples, method 300 may further include feeding fluid into and through a fluid passageway 202 within the overlay 112 in order to change a temperature of the overlay 112.

FIG. 9 depicts an example method comprising steps that are performed sequentially in the order recited. However, it should be understood from the description herein that one or more steps may be omitted and/or performed out of the described sequence of the process while still achieving the desired result.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wearable wound treatment simulation device comprising:
   a housing configured to be secured to a subject;
   a removable wound structure at least partially positioned within the housing;
   a pump configured to apply force or pressure to the wound structure;
   a power supply configured to drive the pump;
   one or more sensors mounted to the housing and electrically connected to a microprocessor, the one or more sensors being operable to detect the application of force or pressure to the removable wound structure;
   wherein the microprocessor is configured to:
      determine whether the detected application of force or pressure exceeds a predetermined threshold, and
      activate an actuator to provide haptic feedback to the subject when the detected application of force or pressure exceeds the predetermined threshold; and
   wherein the actuator is positioned separately from the housing, such that the haptic feedback is not received by the housing.

2. The device of claim 1, wherein the wound structure has a top surface, a bottom surface, and at least one cavity configured to contain a wound fluid within the removable wound structure, the cavity in fluid communication with the top surface of the wound structure.

3. The device of claim 2, wherein the pump is configured to apply pressure to the wound fluid within the cavity, and the application of force or pressure to the wound structure evacuates the wound fluid from the cavity of the wound structure to a portion of the top surface.

4. The device of claim 3, wherein the top surface of the wound structure is adapted to give an appearance and texture of an injury.

5. The device of claim 3, wherein the top surface includes a plurality of holes through which the wound fluid flows out of the cavity.

6. The device of claim 1, wherein the wound structure further comprises an overlay, the overlay circumscribing an outer periphery of the wound structure and comprising one or more thermochromic pigments adapted to change in color based on a predetermined temperature threshold.

7. The device of claim 5, wherein the bottom surface has an opening in communication with the cavity, and further comprising one or more input tubes configured to be connected with the opening, the one or more input tubes being respectively connected to one or more containers, the one or more containers each storing a respective simulated biological fluid.

8. The device of claim 7, wherein the pump comprises one or more peristaltic pumps coupled to respective ones of the one or more input tubes.

9. The device of claim 8, wherein the one or more input tubes comprises a first input tube and a second input tube connected to respective first and second containers, the first container storing a first simulated biological fluid having a first viscosity, the second container storing a second simulated biological fluid having a second viscosity that is different from the first viscosity.

10. The device of claim 9, wherein the first and second biological fluids are at least partially immiscible when combined to form the wound fluid.

11. A method of operating a wound treatment simulation device, the steps comprising:
   securing a housing to a subject, the housing at least partially containing a removable wound structure;
   pumping a wound fluid into the wound structure with a pump, the wound structure configured to be securable to a subject;
   detecting an application of force or pressure to the wound structure;
   determining whether the detected application of force or pressure exceeds a predetermined threshold;
   activating an actuator to provide haptic feedback to the subject when the detected application of force or pressure exceeds the predetermined threshold, the actuator being positioned separately from the housing, such that the haptic feedback is not received by the housing.

12. The method of claim 11, further comprising modifying an operation of the pump in response to detecting the application of force or pressure to the wound structure.

13. The method of claim 11, further comprising combining a first simulated biological fluid having a first viscosity and a second simulated biological fluid having a second viscosity that is different from the first viscosity to generate the wound fluid, the first and second biological fluids being at least partially immiscible when combined to form the wound fluid.

14. The method of claim 11, wherein an overlay of the wound structure comprises one or more thermochromic pigments adapted to change in color based on a predetermined temperature threshold, and further comprising feeding fluid into a fluid passageway within the overlay in order to change a temperature of the overlay.

* * * * *